March 28, 1933.  K. MIDDELBOE  1,903,188
PACKING MACHINE FOR PULVERULENT MATERIAL
Filed March 24, 1931 2 Sheets-Sheet 2
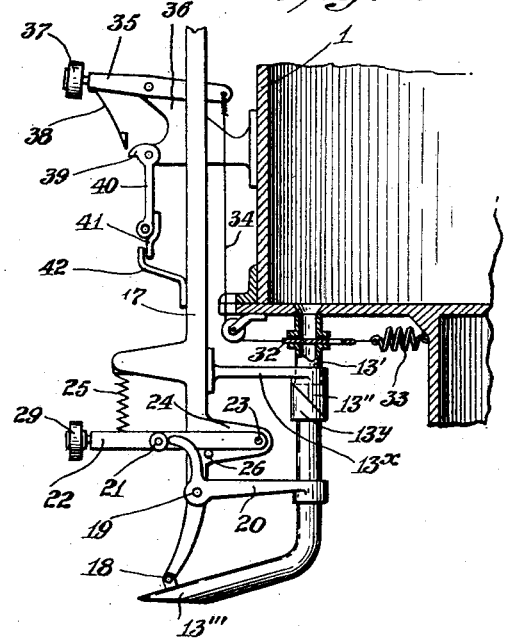
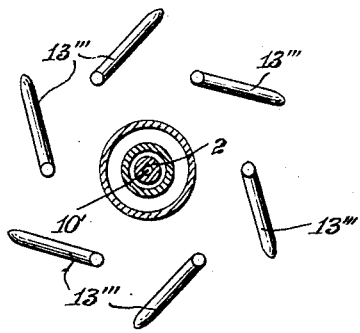
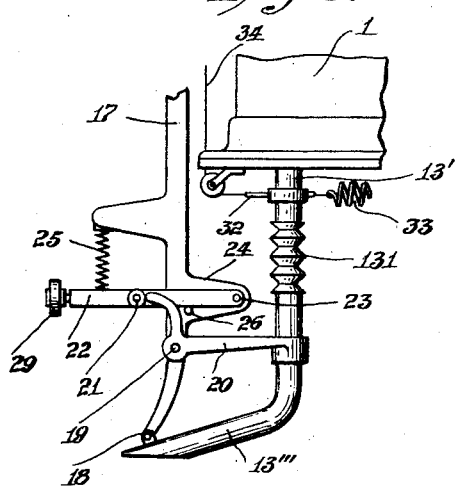
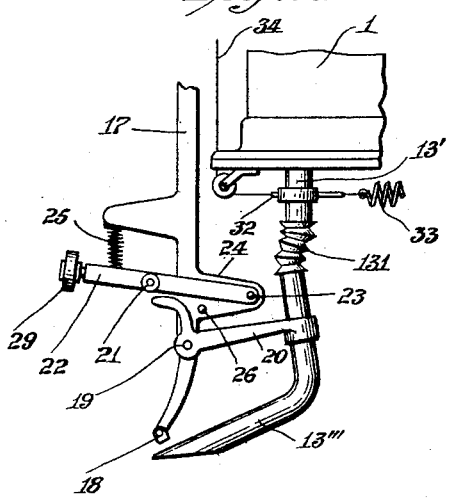
INVENTOR
Kristian Middelboe
BY
Redding, Greeley, O'Shea Campbell
ATTORNEYS Patented Mar. 28, 1933

1,903,188

UNITED STATES PATENT OFFICE

KRISTIAN MIDDELBOE, OF COPENHAGEN, DENMARK, ASSIGNOR TO F. L. SMIDTH & CO., OF NEW YORK, N. Y., A CORPORATION OF NEW JERSEY

PACKING MACHINE FOR PULVERULENT MATERIAL

Application filed March 24, 1931, Serial No. 524,799, and in Great Britain April 7, 1930.

A modern packing and weighing machine for pulverous material consists as a rule of three main parts, namely a so-called filling tank adapted to hold a certain quantity of material, one or more filling spouts by way of which the material is fed into the bags or other receptacles and a weighing device for regulating the quantity fed into the bags, or for checking this weight. The capacity of such a machine can be increased by increasing the number of filling spouts and thereby enabling several bags to be filled simultaneously. The use of several filling spouts, however, requires the operator, who has to apply the empty bags to the spouts, to move through considerable distances, and in order to avoid the loss of time and power caused thereby the filling spouts have been arranged in a horizontal circle, and have been adapted to rotate about the vertical axis of this circle so as to pass, in succession, the fixed position of the operator whereby the work of the latter is reduced to applying the bags to the filling spouts as they move past him.

The machines of the last mentioned kind, however, suffer from certain drawbacks either in respect to limited capacity or in respect to the accuracy of the weighing process, or in both respects.

In one of the proposed types of machines with several filling spouts rotating about the axis of the machine the filling tank has been left stationary, the material being directed thence to the filling spouts as they rotate about the axis of the machine, by means of a feeder drum which rotates with the spouts and serves to distribute the material uniformly to all the filling spouts. Such a distribution, however, cannot be really uniform, and the flow of material, i. e. the quantity of material supplied to the filling spouts per unit of time, will therefore not be constant, neither as far as one individual spout is concerned nor as far as different spouts are concerned. Now, however, the accuracy of the weighing is dependent on the flow of material being maintained uniform. This is in fact a condition necessary for the supply of a uniform quantity by weight of material to the bag from the moment when the weighing mechanism commences to operate to the moment when it causes the flow of material to stop. If the flow of material is altered during this period the weighing will not be accurate, which is a very serious defect in machines in which this may happen.

In another proposed machine with a plurality of filling spouts rotating about the axis of the machine the individual weighing mechanisms, associated severally with the filling spouts, have been done away with and have been replaced by a single stationary weighing device to which each individual filled bag or the like, during the operation of the machine, is introduced automatically and weighed. This weighing on a single stationary weighing device, however, requires a supplementary filling of the bags whereby the operation of the machine will be complicated, and its capacity reduced.

The present invention has for its object to overcome the above mentioned drawbacks in known filling machines.

The invention is embodied in a machine for filling valve bags with a definite weight of pulverous material in which there is combined with a filling tank rotatably arranged about a vertical axis a number of filling spouts extending from the lower part of the said filling tank and each adapted to serve as a carrier and feeding device for a valve bag, and each provided with an individual weighing mechanism supported by the tank for weighing the contents of the valve bag carried by the spout and with a cut-off mechanism for the supply of material fed by the spout into the valve bag, said cut-off mechanism being controlled by the said weighing mechanism.

Other features of my invention are described in the following specification and claims with reference to the accompanying drawings in which the invention is illustrated, and in which:

Figure 2 is a detail view, in sectional elevation and on a somewhat larger scale of some of the parts shown in Figure 1.

Figures 3 and 4 are detail views in elevation illustrating a modified form of connection between the upper and lower sections of the filling chute.

Figure 5 is a view illustrating a tangential arrangement of the lower sections of the filling spouts, the shaft 2 and the sleeves concentric therewith being shown in horizontal section.

Figure 1:
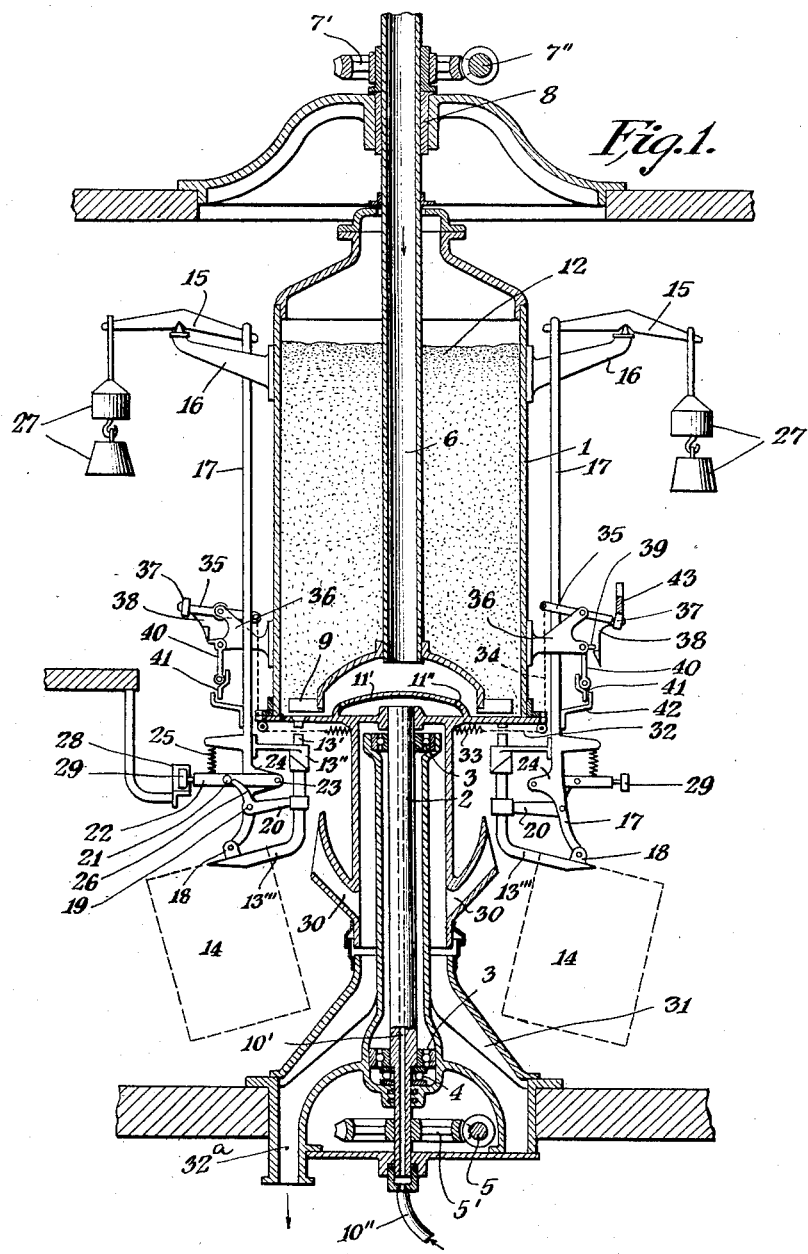
Figure 1 is a view in sectional elevation, in somewhat conventional form, of a machine adapted for the practice of the invention.

The filling hopper 1 is supported by a vertical shaft 2 with lateral bearings 3, 3 and a step-bearing 4, and driven by a worm wheel 5' and worm 5''. The material to be packed is supplied to the tank 1 by a vertical chute 6 rotating in a direction opposite to that of the tank 1 and driven by a worm 7' and worm wheel 7'' attached to the chute and journaled in a bearing 8. The chute is open at the lower end and supports there the stirring arms 9 which serves to stir the material in the tank. The supply of air serving to give the material a liquid-like fluidity is admitted by way of a channel 10', which passes lengthwise through the shaft 2 and is connected at its lower end to a supply pipe 10, for compressed air and ends at the top below a shield 11' with a number of openings 11'' which allow the air to escape in the neighbourhood of the stirring arms 9. In the tank 1 the surface 12 of the fluent mass of powder is maintained at a constant level by regulation of the quantity supplied, which may be effected by automatically acting means not shown on the drawings.

The filling spouts adapted to support the bags are provided in suitable number, depending on the size of the machine, and arranged in a circle below the bottom of the tank 1, and each filling spout consists of an outlet section 13' fixed to the tank and opening into the same and a movable angular section 13'', which normally forms a continuation of the section 13' is directed away from the axis of the machine and slopes slightly downward. This section 13'', on which the bag 14 hangs while being filled is pivotally attached to the weighing mechanism of the machine, in such a manner that when released it can swing, from the position shown on the drawings, a limited distance towards the axis of the machine under the influence of the weight of the filled bag, whereby such lower section of the pipe will be inclined more than normally and permit the discharge of the bag. The upper somewhat enlarged, two-part portion of the spout 13'', encircles like a sleeve the lower end of the outlet pipe 13' on which it can slide slightly up and down. While the filling spout 13'', swings downward the said sleeve separates along an oblique plane, and the upper fixed part of the sleeve is supported by an arm projecting from the suspension rod 17 of the weighing mechanism. In the outlet pipe 13' a gate is provided which will be described below.

As mentioned above the section 13''' of the filling spout is pivotally attached to the weighing mechanism associated with the spout, and is therefore supported thereby together with the suspended bag. The weighing mechanism consists mainly of a double-armed lever 15, which is supported on a bracket 16 projecting from the wall of the tank 1, and supports on its inner arm a vertical rod 17 which extends down along the side of the tank and supports at its lower end a lug or presser 18 which rests firmly against the bag 14 in position on the filling spout 13''', whereby the bag is maintained in position on the filling spout. The vertical rod 17 is fitted with a pivot pin 19 for a bell-crank lever 20, one arm of which is directed towards the tank and supports the filling tube 13''', while as long as the bag is to hang on the filling spout the other arm, which is directed outward and upward, bears against the rear side of a lug 21 of another but one-armed lever 22 pivoted about a pin 23 on a horizontal projection 24 from the inner side of the rod 17. A pressure spring 25 maintains normally this lever 22 pressed down against a stop 26 on the side of the rod 17. This rod together with the mechanism and bag supported thereby is counter-balanced by a weight 27 on the outstanding arm of the lever 15. When this mechanism occupies the position shown on the drawings it will be seen that the individual parts thereof are relatively immovable, but the rod 17 with the mechanism and bag attached thereto, when actuated by the weight of the bag, will be free to sink down vertically in consequence of the bag having received its proper charge.

After such a descent of the rod 17 the release and re-adjustment of the mechanism, so that the section 13''' the filling spout may swing down and the bag be thereby deposited, is effected by an inclined fixed guide rail 28 outside of the machine and adapted to engage a roll 29 on the free end of the lever 22 in such a manner that the lever will be raised, whereby the stopping lug 21 releases the bell-crank lever 20.

The automatic cut-off of the flow of material from the tank 1 to the filling spouts 13', 13''' when the bag concerned has received its proper charge must be effected by the provision of an automatically acting cut-off or closing mechanism, which may be constructed in various manners. An example of the construction of such a mechanism is shown on the drawings, the assumption being made that the flow of material to each individual filling spout is stopped by means of a horizontal slide 32 at a right angle to the filling spout and passing through the upper part 13' of the latter which is fixed to the tank. This slide is shown at the left in Figures 1 and 2 in closed position the corresponding bag being supposed to have just received its full charge, but the slide to the right is shown in open position. The slide 32 is maintained in closed position by means of a tension spring 33 and in open position by a pawl mechanism actuating the slide through a cord 34. This pawl mechanism consists of a two-armed lever 35 the pivot pin of which is supported by a bracket 36 attached to the wall of the tank 1. The inner end of the lever is attached to the cord 34, and the outer end supports a roll 37 and a resilient pawl 38. When the slide 32 is open this pawl rests against the under side of the short arm 39 of a bell-crank lever, the pivot pin of which is supported by the bracket 36, while the end of the long arm 40 with an extension 41 linked thereto and free to turn outward (away from the axis of the machine), but not inward, rests against the inner side of a stop 42 provided on the vertical rod 17 of the weighing mechanism. As long as the pawl 38 bears against the under side of the outer end of the short arm 39, as shown to the right in Figure 1, the slide 32 will remain open, but when the pawl is released from this position, as shown to the left in the figure, then the tension spring 33 will pull the slide into its closing position, and at the same time the lever will tip into its other position of repose.

The release of the pawl from its locking position (to the right in Figure 1, open slide) to its free position (to the left in the figure, closed slide) is effected automatically, when the bag has received its proper charge and, consequently, the rod 17 of the weighing mechanism sinks down. Thereby the stop 42 will release the lever 39, 40 which latter then will swing out from the machine owing to the pressure of the spring 38, so that the lever 35 will be released. The lever 39, 40 will then by its own weight swing back to the position shown on the drawings, while its linked extension slides over the stop 42.

On the other hand, the coupling of the pawl into the locking position is effected by the roll 37 of the lever 35 being during the rotation of the machine moved below an inclined guide rail 43, which is rigidly attached at the point where the slides 32 have to be opened after the bags have been suspended. This rail will force downward the outer end of the lever, until the pawl 38 engages from below the short arm 39 of the lever 39, 40, and presses the end piece 41 of the long arm 40 firmly against the stop 42, whereby equilibrium sets in.

The dust produced by filling the bags is removed by suction orifices 30 on a tubular chamber 31 encircling the shaft 2, a vacuum being produced in said chamber by suction from a pipe 32ª.

From the above it will be understood that the machine acts in the following manner:

From a fixed stand the operator attaches the empty bags to the filling spouts in succession as they move past him, and this is the only manual work he has to perform. When a suspended bag passes below the fixed rail 43 (to the right in Figure 1) the latter opens automatically the slide 32 in the filling spout of the bag, and the filling begins then automatically and continues until the bag has attained its proper weight. Then the vertical rod 17 of the lever mechanism sinks down, the lever 39, 40 is released, the slide 32 closes, the rail 28 releases the lever 20, the filling spout section 13''' swings downward, and the bag slides free of the filling spout, as on to a conveyor belt, the weight of the filling spout section 13''' causes again the lever 20 to swing into its normal position behind the stopping lug 21, while in the meantime the lever 22 has been pressed down against the stop 26 by the spring 25, and a fresh bag is attached to the filling spout, before the roll 29 leaves the guide rail 28.

The mechanical details of construction shown in the embodiment described here by way of example may be modified within wide limits, without the machine coming thereby outside of the frame of the invention.

The free outer ends of the filling spouts may further be turned more or less in tangential direction, so as to point forward in the direction of the rotation. It will then be easier for the operator to attach the bags, as he will then have only to hold the valve of the bag up in front of the orifice of the filling spout, which will then enter the bag without further effort on the part of the operator.

In the construction shown in Figures 1 and 2 the section 13' receives loosely a sleevelike portion 13'' which is cut off obliquely and is supported from the rod 17 by an arm 13x. The vertical portion of the section 13''' has at its upper end a coacting portion 13y also cut off obliquely. This construction permits the section 13''', when released, to swing on its pivot and discharge the bag, and at the same time, when the bag has been discharged and the section swings back to its normal position, assures alinement of the bore of the two sections 13' and 13'''. In the construction shown in Figures 3 and 4 the two sections 13' and 13''' are connected by a jointed or flexible portion 131 which also permits the section 13''' to swing on its pivot to discharge the bag and to return to normal position without disconnecting the two sections.

Having now particularly described and ascertained the nature of my said invention and in what manner the same is to be performed, I declare that what I claim as my invention is:

1. In a machine for filling bags with a definite weight of pulverous material the combination with a filling tank rotatable about a vertical axis, of a number of filling spouts extending from the lower part of the said filling tank, and each adapted to serve as a carrier and feeding device for a bag, and each provided with an individual weighing mechanism supported by the tank for weighing the contents of the bag carried by the spout and with a cut-off for the material fed by the spout into the bag, said cut-off being controlled by the said weighing mechanism.

2. In a machine for filling bags with a definite weight of pulverous material the combination with a filling tank rotatable about a vertical axis and provided at its lower part with inlets for air under pressure and in its interior with a stirring device, of a number of filling spouts extending from the lower part of the said filling tank and each adapted to serve as a carrier and feeding device for a bag, and each provided with an individual weighing mechanism supported by the tank for weighing the contents of the bag carried by the spout, and with a cut-off for the material fed by the spout into the bag, said cut-off being controlled by the said weighing mechanism.

3. In a machine for filling bags with a definite weight of pulverous material the combination with a filling tank rotatable about a vertical axis and provided at its lower part with inlets for air under pressure and in its interior with a stirring device consisting in arms extending over the bottom of the tank from a hollow vertically and axially disposed shaft serving as a feeding tube for the material, of a number of filling spouts extending from the lower part of the said filling tank and each adapted to serve as a carrier and feeding device for a bag, and each provided with an individual weighing mechanism supported by the tank for weighing the contents of the bag carried by the spout and with a cut-off for the material fed by the spout into the bag, said cut-off being controlled by the said weighing mechanism.

4. In a machine for filling bags with a definite weight of pulverous material the combination with a filling tank rotatable about a vertical axis and provided at its lower part with inlets for air under pressure and in its interior with a stirring device having arms extending over the bottom of the tank from a hollow vertically and axially disposed shaft serving as a feeding tube for the material, of a number of filling spouts extending from the lower part of the said filling tank and each adapted to serve as a carrier and feeding device for a bag, and each provided with an individual weighing mechanism supported by the tank for weighing the contents of the bag carried by the spout, and with a cut-off for the material fed by the spout into the bag, said cut-off being controlled by the said weighing mechanism, and each such spout being pivotally suspended in its weighing mechanism by means of a device which, after the bag has been duly filled, will engage a stationary releasing device and thereby allow the spout to swing down and discharge the bag.

5. In a machine for filling bags with pulverous material, the combination with a filling tank rotatable about a vertical axis, of a number of filling spouts extending from the lower part of the filling tank and each adapted to serve as a carrier and feeding device for a bag, a cut-off mechanism to control the flow of material through the spout, and means to actuate the cut-off.

This specification signed this twenty-seventh day of February A. D. 1931.

KRISTIAN MIDDELBOE.